April 17, 1928.
M. C. MYERS
TIRE BOOT OR PATCH
Filed March 10, 1927
1,666,863
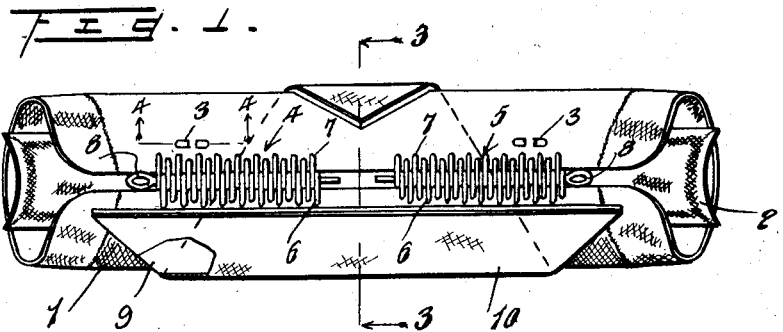
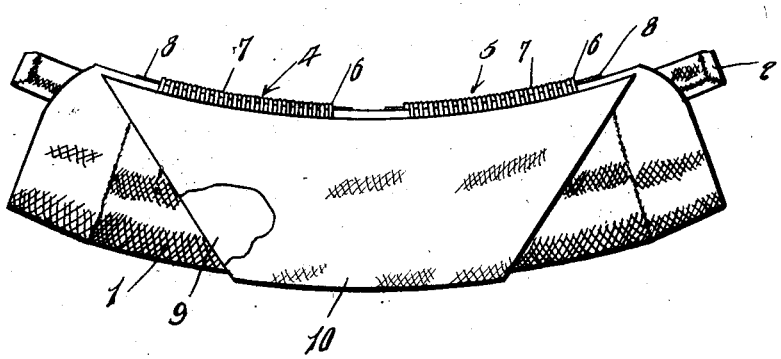
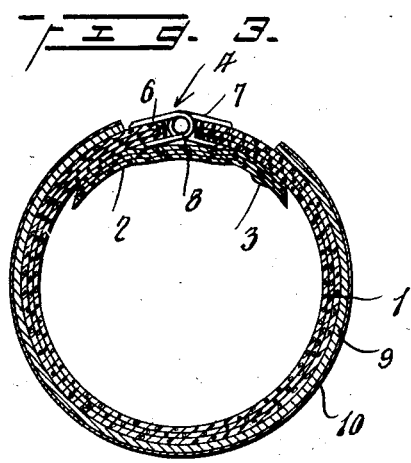
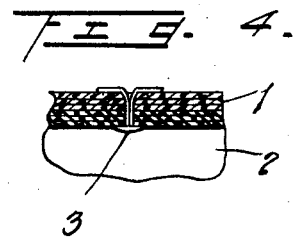
Inventor
M. C. Myers,
By
Attorney Patented Apr. 17, 1928.

1,666,863

UNITED STATES PATENT OFFICE.

MARION C. MYERS, OF TENINO, WASHINGTON.

TIRE BOOT OR PATCH.

Application filed March 10, 1927. Serial No. 174,357.

This invention relates to improvements in that type of tire boot or patch which is adapted to be placed inside the tire casing about the inner tube to close a blow-out or rim cut and which embodies an arcuate split sleeve and a lacing connecting the inner or longitudinal edges of the sleeve. As it only connects comparatively short portions of the inner or longitudinal edges of the sleeve and as it is positioned centrally between the ends of the sleeve, the lacing cannot function to hold the ends against spreading, and due thereto this boot or patch cannot be used effectively in connection with a tire of which the casing has a blow-out or rim cut of greater length than that of the parts of the sleeve connected by the lacing.

The present invention has for one of its objects to improve this boot or patch to the end that this disadvantage thereof may be overcome, and to attain this end comprehends the provision of the boot or patch with a two part lacing of which the respective parts are arranged at opposite sides of and in spaced relation to the transverse center of the sleeve, the position and length of the parts of the lacing being such as to hold the ends of the sleeve against spreading and such as to obviate any liability of the diametrical and circumferential contours of the sleeve being distorted during the application of the boot or patch.

A further object of the invention is to provide a boot or patch of the character stated with a strip of cured rubber adapted to close the blow-out or rim cut in a manner to prevent water, dust, sand and the like from passing therethrough into the tire.

The invention is hereinafter more fully described and claimed, and illustrated in the accompanying drawing, wherein:

Figure 1 is an inner plan view of a tire boot or patch embodying my invention,

Figure 2 is a view in side elevation of the boot or patch,

Figure 3 is a transverse sectional view taken on the plane indicated by the line 3—3 of Figure 1, and Figure 4 is a detail sectional view taken on the plane indicated by the line 4—4 of Figure 1.

The boot or patch comprises an arcuate split sleeve 1 which is adapted to be placed within a tire casing about the inner tube. The sleeve 1, which may be made of any desired length, comprises a plurality of layers of tire fabric cemented or vulcanized together, and is provided with chamfered end edges and a flap 2. The flap 2, which prevents the chafing of the inner tube by the inner longitudinal edges of the sleeve 1 and by the lacing, is longer than the sleeve, and has chamfered end and side edges. The flap 2 has one longitudinal edge thereof secured by brass rivets 3 to the sleeve 1, and extends across the open inner side of the sleeve.

The lacing is in two parts, and the respective parts 4 and 5 thereof are located at opposite sides of and spaced from the transverse center of the sleeve 1. Each part of the lacing comprises a series of wire loops 6 secured to one of the inner or longitudinal edges of the sleeve, and a series of similar elements 7 secured to the other inner or longitudinal edge of the sleeve. The wire loops 6 and 7 of each part of the lacing are arranged to overlap, and are connected together by a pin 8.

As the parts 4 and 5 thereof are arranged at opposite sides of and spaced from the transverse center of the sleeve 1, and as the outer ends of said parts are located comparatively close to the ends of the sleeve, the lacing will prevent the ends of the sleeve from spreading, with the result that the boot or patch may be used effectively in connection with a tire of which the casing has a blow-out or rim cut greater in length than the connected portions of the inner or longitudinal edges of the sleeve, but of less length than the sleeve. Due to the manner in which the lacing parts 4 and 5 are arranged with respect to the transverse center of the sleeve 1, and as their outer ends are spaced from the corresponding ends of the sleeve, the lacing will not when the loops 6 and 7 thereof are connected distort the diametrical and circumferential contours of the sleeve. The open space between the parts of the lacing permits the boot or patch to expand sufficiently to adapt it to snugly fit the injured part of the tire casing.

A strip 9 of cured rubber is secured to the outer surface of the sleeve 1, and is adapted to seal or close the blow-out or rim cut in the tire casing so as to prevent water, dust, sand and the like from entering the tire casing through the blow-out or rim cut. The strip 9 is of triangular formation and is secured to the sleeve 1 with its base edge arranged in close parallel relation to one of the inner or longitudinal edges of the sleeve. The circumferential dimension of the strip 9 is less than the corresponding dimension of the sleeve 1. The strip 9 is protected by a strip 10 of holland cloth which is similar in contour thereto and is to be removed immediately prior to the application of the boot or patch. The strip 9 is secured to the tire casing by cement which is applied to the latter about the injured part thereof. The boot or patch may be so arranged within the tire as to properly position the rubber strip 9 for sealing a blow-out or rim cut in either side or in the tread of the tire casing, as will be apparent. As the strip 9 is of triangular contour, it does not extend over the entire outer surface of the boot or patch and will not therefore materially reduce the flexibility of the boot or patch. The strip 9 affords full protection for the reason that a tire casing is seldom if ever rim cut on both sides and for the reason that the boot or patch may be arranged within the tire casing in a manner to position the base of the strip adjacent the rim cut.

It should be understood that the drawing is merely illustrative and does not pretend to give exact proportions. Furthermore, the drawing is illustrative of a preferred construction, it being my expectation that various changes and modifications may be made without departing from the spirit and scope of my invention.

What is claimed is:—

1. A boot or patch comprising a split sleeve, and a two part lacing connecting the inner or longitudinal edges of the sleeve, the respective parts of the lacing being arranged at opposite sides of the transverse center of the sleeve.

2. A boot or patch comprising a split sleeve, and a two part lacing connecting the inner or longitudinal edges of the sleeve, the respective parts of the lacing being arranged at opposite sides and spaced from the transverse center of the sleeve.

3. A boot or patch comprising a split sleeve, and a multiple part lacing connecting the inner or longitudinal edges of the sleeve, the respective parts of the lacing being arranged between the transverse center and the ends of the sleeve.

4. A boot or patch comprising a split sleeve, a lacing connecting the inner or longitudinal edges of the sleeve, and a strip of cured rubber of triangular contour secured to the outer surface of the sleeve with its base edge in parallel arrangement with one of the longitudinal edges of the sleeve.

5. A boot or patch comprising a split sleeve, and means connecting the inner or longitudinal edges of the sleeve in a manner to leave the central portions of said edges free so as to permit the central portion of the sleeve to expand sufficiently for snug engagement with an injured part of a tire casing.

In testimony whereof I affix my signature.

MARION C. MYERS.